United States Patent [19]

Alsop et al.

[11] Patent Number: 4,576,787
[45] Date of Patent: Mar. 18, 1986

[54] BURNABLE ABSORBER ASSEMBLY

[75] Inventors: Brian H. Alsop, Penn Township, Westmoreland County; Frank D. Popa; William E. Edwards, both of Monroeville, all of Pa.

[73] Assignee: Westinghouse Electric Corp., Pittsburgh, Pa.

[21] Appl. No.: 564,048

[22] Filed: Dec. 21, 1983

[51] Int. Cl.[4] .............................................. G21C 3/32
[52] U.S. Cl. .................................. 376/447; 376/451
[58] Field of Search ............... 376/419, 429, 447, 451

[56] References Cited

U.S. PATENT DOCUMENTS 3,510,398  5/1970  Wood .................................. 376/447
3,520,776  7/1970  Charrault .......................... 376/447

Primary Examiner—Donald P. Walsh
Attorney, Agent, or Firm—D. E. Erickson

[57] ABSTRACT

Elongated tubular elements containing burnable absorber material are clustered in an array to provide a burnable absorber assembly for insertion within one or more guide thimbles of a fuel assembly for controlling reactivity. The burnable absorber assembly, in alternative embodiments, include three tubular elements in triangular relationship and four tubular elements in rectangular relationship. The use of the burnable absorber assembly within the guide thimbles of a fuel assembly results in increased core thermal margin, minimization of end of cycle reactivity penalty, increase in operating cycle length before required refueling, and the ability to utilize burnable absorber assemblies having different strengths at different locations within the fuel assembly for controlling fuel assemblies having significant power gradients, as well as finer control of radial powered distribution and thus achieving lower peaking factors.

22 Claims, 7 Drawing Figures

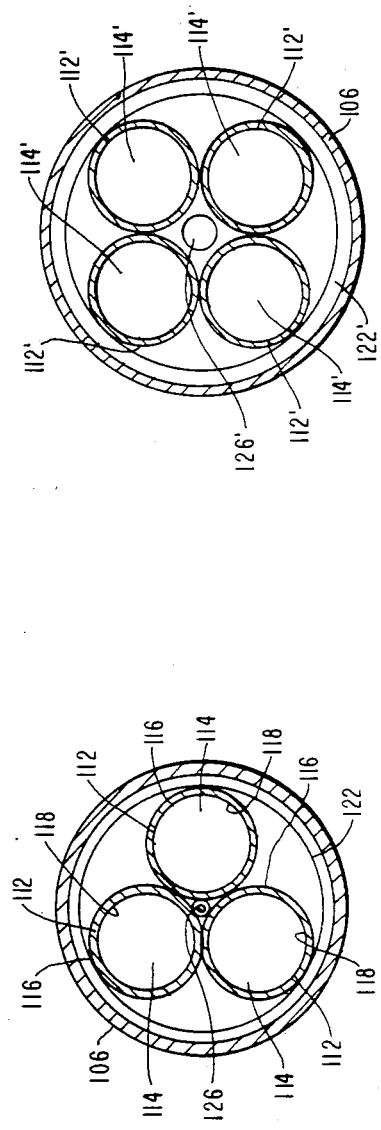
FIG. 5
FIG. 4
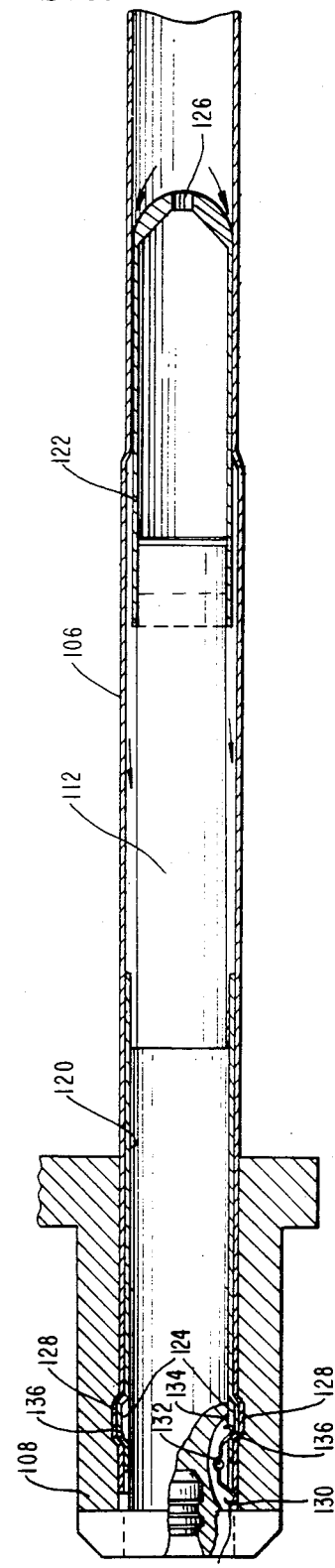
FIG. 3

BURNABLE ABSORBER ASSEMBLY

BACKGROUND OF THE INVENTION

The present invention relates in general to burnable absorbers, also referred to as burnable poisons, for nuclear reactors, and more particularly, to a burnable absorber assembly for use in a nuclear reactor core of fuel assemblies having a plurality of guide thimbles for each receiving a reactor control rod and which burnable absorber assembly is constructed and arranged to be inserted within the guide thimbles for controlling the reactivity and ultimately to extend the life of the fuel assemblies.

The process of nuclear fission involves the disintegration of fissionable nuclear fuel material into two or more fission products of lower mass number. Among other things, the process also includes a net increase in the number of available free neutrons which are the basis for a self-sustaining reaction. When a reactor has operated over a period of time, the fuel assembly with fissionable materials must ultimately be replaced due to depletion. Inasmuch as the process of replacement is time consuming and costly, it is desirable to extend the life of a given fuel assembly as long as practically feasible. For that reason, deliberate additions to the reactor fuel of parasitic neutron-capturing elements in calculated small amounts may lead to highly beneficial effects on a thermal reactor. Such neutron-capturing elements are usually designated as burnable absorbers if they have a high probability or cross-section for absorbing neutrons while producing no new or additional neutrons or changing into new absorbers as a result of neutron absorption. During reactor operation the burnable absorbers are progressively reduced in amount so that there is a compensation made with respect to the concomitant reduction in the fissionable material.

The life of a fuel assembly may be extended by combining an initially larger amount of fissionable material, as well as a calculated amount of burnable absorber. During the early stages of operation of such a fuel assembly, excessive neutrons are absorbed by the burnable absorber which undergoes transformation to elements of low neutron cross-section which do not substantially affect the reactivity of the fuel assembly in the latter period of its life when the availability of fissionable material is lower. The burnable absorber compensates for the larger amount of fissionable material during the early life of the fuel assembly, but progressively less absorber captures neutrons during the latter life of the fuel assembly, so that a long life at relatively constant fission level is assured for the fuel assembly. Accordingly, with a fuel assembly containing both fissionable material and burnable absorber in carefully proportioned quantity, an extended fuel assembly life can be achieved with relatively constant neutron production and reactivity. Burnable absorbers which may be used include boron, gadolinium, samarium, europium, and the like, which upon the absorption of neutrons result in isotopes of sufficiently low neutron capture cross-section so as to be substantially transparent to neutrons.

The incorporation of burnable absorbers in fuel assemblies has thus been recognized in the nuclear field as an effective means of increasing fissionable material capacity and thereby extending reactor core life. Burnable absorbers are used either uniformly mixed with the fissionable material, i.e, distributed absorber, or are placed discretely as separate elements in the reactor core. Thus, the net reactivity of the reactor core is maintained relatively constant over the active life of the reactor core. However, the use of burnable absorbers either directly with the fissionable material or as separate elements in the reactor core has its limitations in extending the life of a given fuel assembly beyond its originally designed fissionable material replacement cycle. For example, nuclear reactors used for power generation have typically been designed for twelve month fissionable material replacement operating cycles. At the end of the operating cycle, the nuclear reactor core is required to be refueled by replacement of about one-third of its fuel rods containing fissionable material so as to extend the operating cycle of the reactor for an additional twelve months. The process of fissionable material replacement is not only time consuming, for example, taking as much as six weeks, but is also costly in terms of lost power generation. As a consequence, there has been a need for developing the means by which the operating cycle of these power generating nuclear reactors can be increased to, for example, eighteen months without the requirement for fissionable material replacement.

Although the use of burnable absorbers either mixed with the fissionable material or as separate elements in the reactor core has been known to extend the reactor core life and operating cycle, the use of such burnable absorbers in this manner is limited, particularly with regard to existing nuclear reactors designed for a predetermined operating cycle. For example, the use of a burnable absorber in the fuel rods require a corresponding displacement and loss of fissionable material, typically greater than about four percent. As the burnable absorber is therefore not removable from the fuel rod during operation of the nuclear reactor, its presence penalizes core thermal margin by increasing the linear heating rate, i.e., in kilowatts per foot, and heat flux by the percentage of the fissionable material displaced. As an alternative approach, the fissionable material within each of the fuel rods may be enriched to a greater amount so as to extend the operating cycle of the nuclear reactor. In order to compensate for the use of the enriched fissionable material, a plurality of burnable absorbers in the form of rods are required to be inserted throughout the reactor core. This is not always possible as a number of presently installed nuclear reactors use burnable absorbers which displace the fissionable material in the fuel rods and therefore do not provide for the installation of these burnable absorber rods. Furthermore, the enrichment of the fissionable material in these existing reactors is limited as the resulting higher heat generated per fuel rod often cannot be adequately controlled. Thus, this limitation on the ability to enrich the fissionable material within the fuel rods, as well as the required need for burnable absorption rods, which in themselves displace fuel rods, result in the operation of a nuclear reactor at less than its maximum rated power output. This reduction in power output results in a financial loss which generally cannot be recouped by the extended life of the nuclear reactor operating cycle.

Accordingly, it can be appreciated that there is an unsolved need for a burnable absorber assembly which may be utilized with existing, as well as future nuclear reactors, for example, of the power generation type, which extends their operating cycle and which eliminates the above-noted thermal penalty, in addition to reducing fissionable material cycle costs.

SUMMARY OF THE INVENTION

It is broadly an object of the present invention to provide a burnable absorber assembly which overcomes or avoids one or more of the foregoing disadvantages resulting from the use of the above-mentioned burnable absorbers, and which fulfills the specific requirements of such a burnable absorber for use generally with nuclear reactors which are provided with a plurality of guide thimbles for receiving a control rod or instrumentation. Specifically, it is within the contemplation of one aspect of the present invention to provide a burnable absorber assembly which permits a retrofit for existing nuclear reactors, such as of the power generation type, so as to increase the operating cycle from, for example, twelve months to eighteen months, before required refueling of the fissionable material.

A further object of the present invention is to provide a burnable absorber assembly which increases core thermal margin and minimizes the end of operating cycle residual reactivity penalty.

A still further object of the present invention is to provide a burnable absorber assembly which eliminates the use of fissionable material displacing burnable absorbers.

A still further object of the present invention is to provide a burnable absorber assembly which permits operation of the nuclear reactor at its maximum power rated output.

A yet still even further object of the present invention is to provide a burnable absorber assembly which levels out the output power of the nuclear reactor over its operating cycle and which lowers the operating temperature of the individual fuel rods.

A yet still even further object of the present invention is to provide a burnable absorber assembly which permits fine tuning of radial power distribution by maintaining the peak power fuel rods within desired limitations by using one or a plurality of burnable absorber assemblies radially positioned within the reactor core.

A yet still even further object of the present invention is to provide a burnable absorber assembly which permits the ability to poison irradiated fuel assemblies at any time in a retrofit manner.

In accordance with one embodiment of the present invention, there is provided a burnable absorber assembly for use with a nuclear reactor. The burnable absorber assembly is constructed of a plurality of elements containing burnable absorber material, each of the elements having an opening extending therethrough, the elements arranged adjacent one another so that the opening within the elements form a plurality of longitudinal channels extending through the assembly.

In accordance with the above embodiment of the present invention, the elements are arranged to form three channels in triangular relationship or to form four channels in rectangular relationship, wherein the plurality of channels are arranged parallel to one another and accordingly parallel to the longitudinal axis of the assembly.

Still further in accordance with the above embodiment of the present invention, there is provided a first cap secured to one common end of the elements and a second cap secured to the other common end of the elements for securing the elements adjacent one another. The first cap is provided with means for supplying a fluid to each of the plurality of channels, while the second cap includes attaching means for releasably attaching the assembly within a tube of a nuclear reactor core.

BRIEF DESCRIPTION OF THE DRAWINGS

The above description, as well as further objects, features and advantages of the present invention, will be more fully understood by reference to the following detailed description of the presently preferred, but nonetheless illustrative, burnable absorber assembly in accordance with the present invention, when taken in conjunction with the accompanying drawings, wherein:

FIG. 3 is a cross-sectional view of the burnable absorber assembly in accordance with the present invention as shown in FIG. 2 and inserted within a guide thimble of the fuel assembly as shown in FIG. 1;

FIG. 4 is a cross-sectional view of the burnable absorber assembly as shown in FIG. 2 inserted within a guide thimble of a fuel assembly and constructed of three elongated tubular elements arranged in triangular relationship;

FIG. 5 is a cross-sectional view of the burnable absorber assembly as shown in FIG. 2 inserted within a guide thimble of a fuel assembly and constructed of four elongated tubular elements arranged in rectangular relationship;

DETAILED DESCRIPTION

Figure 1:
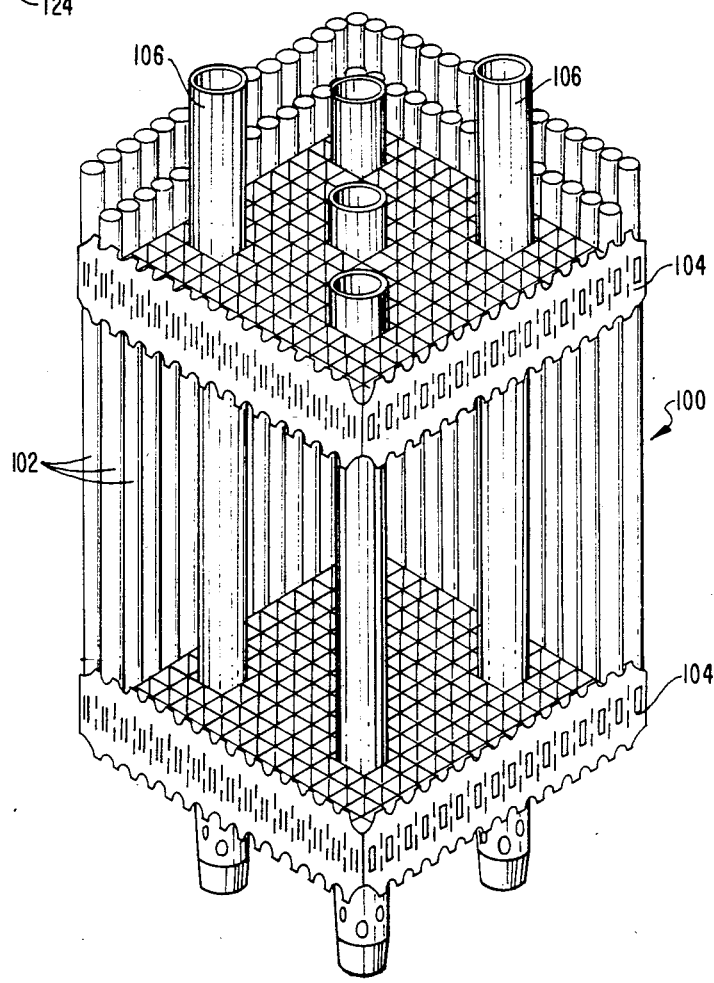
FIG. 1 is a perspective view of a portion of a nuclear reactor fuel assembly showing a plurality of guide thimbles for receiving control rods therein.

Referring generally to the drawings in which like reference numerals represent like elements, there is shown in FIG. 1 a perspective view of a portion of a fuel assembly of a nuclear reactor generally designated by reference numeral 100. The fuel assembly 100 is generally constructed of a plurality of nuclear fuel rods 102 arranged adjacent one another in parallel alignment and extending along the length of the fuel assembly 100. The fuel rods 102 are held in spaced relationship to each other by a number of spacer grids 104 spaced along the length of the fuel assembly 100. Positioned within the matrix of fuel rods 102 are several control rod guide thimbles or tubes 106. The spacer grids 104 are attached to the guide thimbles 106 which are located at predetermined positions within the fuel assembly 100, and the spacer grids traversely separate and traversely restrain the array of fuel rods 102. The fuel assembly 100 includes a top nozzle 108, see FIG. 3, and a bottom nozzle (not shown) to which the upper end and the lower end, respectively, of the guide thimbles 106 are attached to form an integral assembly capable of being conventionally handled without damaging the assembly components. Typically, the guide thimbles 106 have sleeves (not shown) for weld compatibility with the spacer grids 104 and the bottom nozzle (not shown).

As shown in FIG. 1, the guide thimbles 106 are disposed within the matrix of the fuel rods 102. To control the fission process, a multiplicity of control rods (not shown) are provided reciprocally movable within the guide thimbles 106 of the fuel assembly 100. As is typical in the control of the fission process of a nuclear reactor, the control rods are inserted within the guide thimbles 106 only about twenty percent of the operating time of the nuclear reactor. Although the fuel assembly 100 has been described with respect to a specific construction as shown in FIG. 1, it is to be understood that such construction is merely illustrative of a typical fuel assembly, the construction of which forms no part of the present invention.

Figure 2:
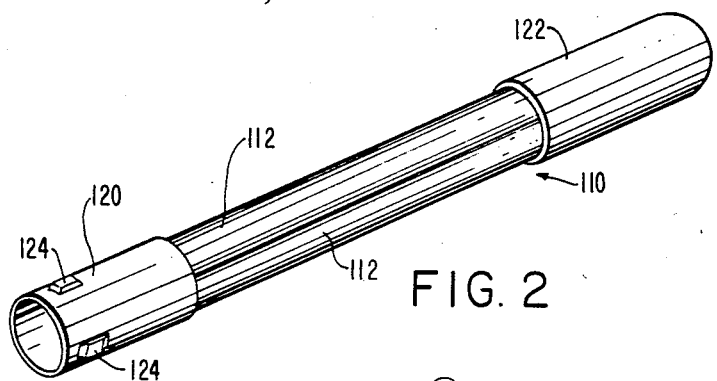
FIG. 2 is a perspective view of a burnable absorber assembly in accordance with the present invention constructed of a plurality of elongated tubular elements.

Referring now to FIGS. 2-4, there will be described the construction of a burnable absorption assembly in accordance with the present invention as generally designated by reference numeral 110. The burnable absorber assembly 110 is constructed of a plurality of elongated tubular elements 112 which contain burnable absorber material. For example, burnable absorbers which may be used include boron, gadolinium, samarium, europium, and the like, which upon the absorption of neutrons result in isotopes of sufficiently low neutron capture cross-section so as to be substantially transparent to neutrons. Each of the tubular elements 112 are constructed in the form of an elongated hollow cylinder, as shown in FIG. 3, having an opening 114 extending through the cylinder to form a longitudinal channel. The tubular elements 112 containing burnable absorber material are commercially available from Westinghouse Electric Corporation of Pittsburgh, Pa., under the trade designation Wet Annular Burnable Absorber Tube. The tubular elements 112 may be constructed from a thin layer of burnable absorber material sandwiched between two concentric elongated cylinders 116, 118 of zirconium alloy and which are sealed at the annular opening of the cylinders at their opposite ends.

In accordance with one embodiment of the present invention, as shown in FIGS. 2 and 3, the burnable absorber assembly 100 is constructed of three elongated tubular elements 112 arranged adjacent one another in triangular relationship. More specifically, the channels formed by the openings 114 extend longitudinally through the burnable absorber assembly 110 in parallel relationship to one another, as well as parallel to the longitudinal axis of the burnable absorber assembly. The tubular elements 112 are typically 11 to 12 feet in length, however, other lengths can be used for the burnable absorber assembly 110 in accordance with the present invention. In addition, it is not required that each of the tubular elements 112 be formed as one integral tubular element. That is, each of the tubular elements 112 may be constructed of a plurality of shorter tubular elements secured to one another in end-to-end relationship so as to form a composite tubular element of desired length. This latter construction has the advantage of being able to readily vary the quantity of burnable absorber material along the length of each of the tubular elements 112. Where the tubular elements 112 are of a composite construction, such elements may be secured in end-to-end relationship by welding, use of sleeve couplings, and the like.

The tubular elements 112 are secured together adjacent one another by a top cap 120 and a bottom cap 122. The top cap 120 is constructed of a hollow cylinder having the tubular elements 112 secured within one end thereof. At the other end of the top cap 120 there is circumferentially provided three spaced apart projections 124 for releasably securing the burnable absorber assembly 110 within a guide thimble 106 as to be described hereinafter. The bottom cap 122 is similarly constructed of a cylinder having the tubular elements 112 secured within one end thereof, while the other end is substantially closed except for an opening 126 of reduced size. Thus, the top cap 120 is secured to one common end of the tubular elements 112 while the bottom cap 122 is secured to the other common end of the tubular elements. As shown in FIG. 5, a second embodiment of the present invention comprises four tubular elements 112' arranged such that their openings 114' form channels arranged longitudinally extending through the assembly in rectangular relationship.

Referring to FIG. 3, the burnable absorber assembly 110 can be inserted within one of the guide thimbles 106 of the fuel assembly 100. The guide thimble 106 at its top portion within the nozzle 108 is provided with mating indents 128 for receiving the projections 124 on the top cap 120 of the burnable absorber assembly 110. In this regard, the burnable absorber assembly 110 is secured within the guide thimble 106 by the mating of the projections 124 with the indents 128. To further insure the integrity of the engagement of the projections 124 with the indents 128, a bias spring 130 is provided secured within the top of the guide thimble 106 by means of a pin 132 so as to press the projections 124 within the mating indents 128. The springs 130 are provided with a curved section 134 which is adapted for engaging a curved portion 136 of the projections 124 so as to facilitate the insertion and withdrawal of the burnable absorber assembly 110 within a guide thimble 106. The reactor fluid, typically water, which acts as a moderator and coolant, enters the guide thimbles 106 from the right as shown in FIG. 3 and flows through the opening 126 within the bottom cap 122 of the burnable absorber assembly 110 and upwardly through the longitudinal channels formed within the tubular elements 112. In addition, the reactor fluid may flow around the burnable absorber assembly 110 within the annular space formed between the burnable absorber assembly and the interior wall surface of the guide thimble 106 as indicated by the arrows.

The burnable absorber assembly 110, comprising a clustered array of elongated tubular elements 112 containing burnable absorber material, may be removably positioned within the four outwardly located guide thimbles 106 as shown in FIG. 1. A fifth burnable absorber assembly 110 can also be inserted within the centrally located guide thimble 106 if desired, which guide thimble is generally used for location of various instrumentation. More specifically, a burnable absorber assembly 110 having a cluster of three tubular elements 112, as shown in FIG. 4, may be inserted in a fuel assembly having a 16×16 array of fuel rods, while a burnable absorber assembly having a cluster of four elongated tubular elements as shown in FIG. 5 may be used in a fuel assembly having a 14×14 array of fuel rods.

The relative strength of the burnable absorber assembly 110 is a function of the number of tubular elements 112 arranged in a cluster and the loading of each element with burnable absorber material. For example, loading of the tubular elements 112 with boron carbide in the range of 12 to 18 weight percent results in a relative absorption strength of 1.0 for a single tubular element, a relative absorption strength of from 1.7 to 1.8 for a cluster of two tubular elements, a relative absorption strength of 2.1 to 2.4 for a cluster of three tubular elements, and a relative absorption strength of 2.3 to 3.0 for a cluster of four tubular elements. Different relative burnable absorption material strengths are possible by substituting non-burnable absorption material or utilizing burnable absorption material having different neutron capture cross-sections. Thus, burnable absorber assemblies 110 may be constructed having different relative absorption strengths for use with the fuel assembly 100 as shown in FIG. 1. Different relative absorption strength burnable absorber assemblies 110 are considered desirable so as to provide the flexibility needed to poison fuel assemblies 100 having significant power gradients across the assembly. Also, fine-tuning of the burnable absorber assembly 110 permits further control of radial power distributions within the fuel assembly 100 and thus results in the achievement of lower peaking factors during operation of the nuclear reactor.

Figure 6:
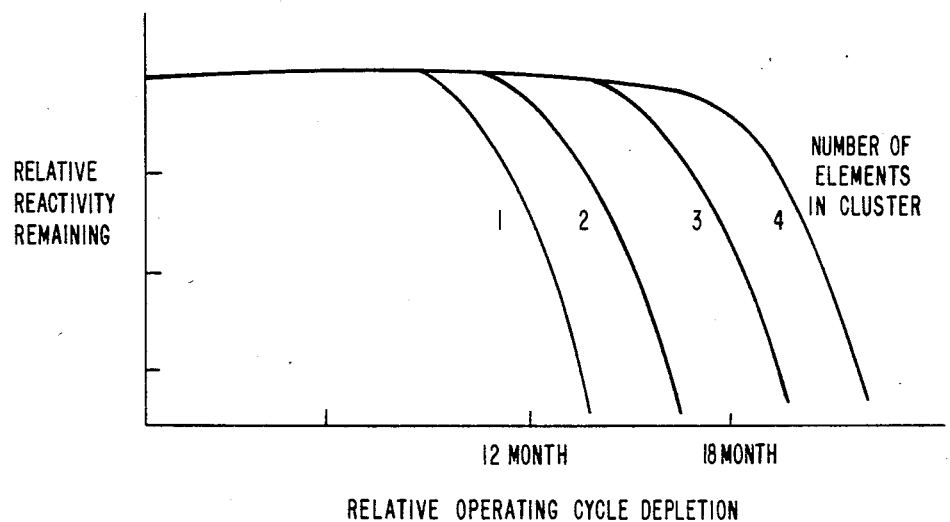
FIG. 6 is a graph depicting the relationship between the relative fuel assembly reactivity versus relative operating cycle depletion.

The burnout behavior of the burnable absorber assembly 110 is also effected by the number of individual tubular elements 112 clustered together and containing the burnable absorber material. Referring to FIG. 6, there is graphically shown the burnout behavior for a burnable absorber assembly 110 having different numbers of tubular elements 112 clustered together in the assembly. For example, the relative reactivity remaining for a burnable absorber assembly 110 having a single tubular element 112 remains substantially constant at its initial value for a period of less than 12 months, at which time, the reactivity of the burnable absorber material within the element begins to substantially decay. On the other hand, it is noted that a burnable absorber assembly 110 containing three tubular elements has its relative reactivity remaining substantially constant at its initial value for greater than eighteen months. In consideration of FIG. 6, the use of a burnable absorber assembly 110 having a cluster of two, three or four tubular elements containing burnable absorber material is superior in results over those containing only one tubular element. Thus, the reactivity of a fuel assembly 100 may be held down for longer periods of time using the burnable absorber assembly 110 in accordance with the present invention having a clustered array of tubular elements 112 containing burnable absorber material which are adapted for insertion within the guide thimbles 106.

The burnable absorber assembly 110 in accordance with the present invention results in increased core thermal margin by elimination of the use of the prior art fuel displacing burnable absorbers, by fine-tuning of radial power distribution, and by the delay and reduction of the rise in reactor core radial peaking factor with reactor core depletion that usually accommodates burnable absorber addition.

Figure 7:
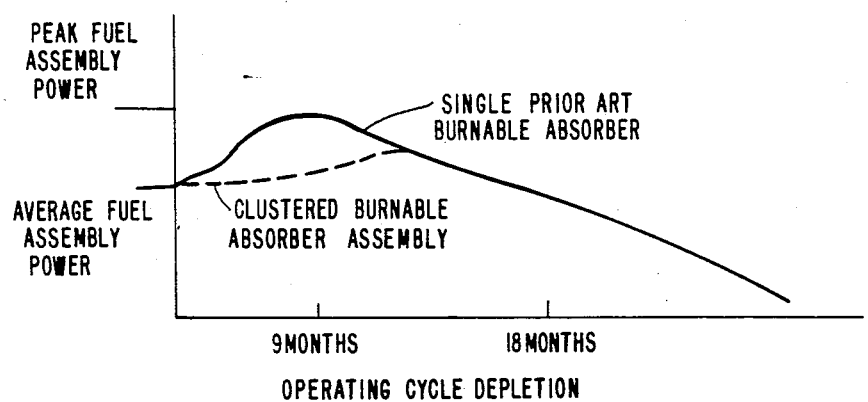
FIG. 7 is a graph depicting the peak and average fuel assembly power versus the relative operating cycle depletion.

There is graphically depicted in FIG. 7 the relationship between the peak and average fuel assembly power versus operating cycle depletion for a conventional burnable absorber assembly having a single burnable absorber rod or tubular element and that of the present invention including a cluster of tubular elements containing burnable absorber material. As shown, the use of the burnable absorber assembly 110 in accordance with the present invention results in the fuel assembly power being controlled at its average power level during the first two-thirds of the operating cycle. At which time, the fuel assembly power begins a gentle decay over the remaining life of the operating cycle. On the other hand, the use of the prior art burnable absorber assembly cannot hold the fuel assembly power to its average value during the first two-thirds of the operating cycle. That is, as shown, the fuel assembly power steadily increases to a peak value at approximately nine months into the operating cycle and then begins its downward decay. Thus, the use of a burnable absorber assembly 110 in accordance with the present invention results in a more uniform control of fuel assembly power during the operating cycle of the nuclear reactor.

In accordance with the present invention, there has thus far been described a burnable absorber assembly for use in a nuclear reactor core of fuel assemblies having a plurality of guide thimbles for each receiving a reactor control rod and which assembly is constructed and arranged to be inserted within the guide thimbles for controlling the reactivity of the fuel assembly. Although the invention herein has been described with reference to particular embodiments, it is to be understood that these embodiments are merely illustrative of the principles and application of the present invention. It is therefore to be understood that numerous modifications may be made in the illustrative embodiments and that other arrangements may be devised without departing from the spirit and scope of the present invention as defined by the appended claims.

We claim:

1. A burnable absorber assembly for insertion within a tube of a nuclear reactor core having a fluid flowing therein, said assembly comprising a plurality of elements each containing burnable absorber material, each of said elements having an opening extending therethrough, said elements arranged adjacent one another in a cluster so that the openings within said elements form a plurality of longitudinal extending channels through said assembly, said cluster of said elements insertable as a unit within said tube of said reactor core whereby a fluid flowing through said tube passes through each of said channels formed by said elements.

2. The burnable absorber assembly of claim 1 wherein said elements are arranged to form three channels in triangular relationship.

3. The burnable absorber assembly of claim 1 wherein said elements are arranged to form four channels in rectangular relationship.

4. The burnable absorber assembly of claim 1 wherein the plurality of said channels are arranged parallel to one another.

5. The burnable absorber assembly of claim 1 further including securing means for securing said elements adjacent one another.

6. The burnable absorber assembly of claim 5 wherein said securing means comprises a first cap secured to one common end of said element and a second cap secured to the other common end of said elements.

7. The burnable absorber assembly of claim 6 wherein said first cap includes means for supplying said fluid to each of the plurality of said channels.

8. The burnable absorber assembly of claim 7 wherein said second cap includes attaching means for releasably attaching said assembly within a tube of a nuclear reactor core.

9. A burnable absorber assembly for insertion within a tube of a nuclear reactor core having a fluid flowing therein, said assembly comprising a plurality of elongated tubular elements each containing burnable absorber material, each of said elements having an opening extending therethrough, said elements arranged adjacent one another in a cluster so that the openings within said elements form at least three longitudinal channels extending through said assembly, said channels being parallel to one another and parallel to the longitudinal axis of said assembly, and securing means at the ends of said elements for securing said elements adjacent one another as a unit, at least one of said securing means having means in fluid communication with each of said openings within said elements for supplying a fluid flowing through said tube of said reactor core into each of said channels formed by said elements.

10. The burnable absorber assembly of claim 9 wherein said elements are arranged in said cluster in triangular relationship.

11. The burnable absorber assembly of claim 9 wherein the openings within said elements form four longitudinal channels.

12. The burnable absorber assembly of claim 11 wherein said elements are arranged in said cluster to form said channels in rectangular relationship.

13. The burnable absorber assembly of claim 9 wherein said securing means comprises a first cap secured to one common end of said elements and a second cap secured to the other common end of said elements.

14. The burnable absorber assembly of claim 13 wherein said first cap includes said means for supplying a fluid to each of the plurality of said channels and said second cap includes attaching means for releasably attaching said assembly within said tube of said nuclear reactor core.

15. The burnable absorber assembly of claim 14 wherein said attaching means comprises a projection extending from said second cap to be received within a mating recess within said tube of said nuclear reactor core.

16. The burnable absorber assembly of claim 15 wherein said attaching means further includes a spring for retaining said projection of said second cap within said mating recess within said tube.

17. The burnable absorber assembly of claim 9 wherein said elements have a circular cross-section.

18. The burnable absorber assembly of claim 9 wherein the quantity of said burnable absorber material varies over a portion of the length of said elements.

19. A burnable absorber assembly for use in a nuclear reactor core having a fluid flowing therein and a plurality of guide thimbles for each receiving a reactor control rod said assembly being insertable within said thimbles for controlling the reactivity of said reactor core, said assembly comprising at least three longitudinally extending tubular elements each containing burnable absorber material, each of said elements having a channel extending longitudinally therethrough, said elements arranged adjacent to one another in a cluster such that said channels are parallel to one another, and a first and second cap respectively secured to the opposite common ends of said elements whereby said elements are maintained as a unit, said first cap having an opening in fluid communication with each of said channels for supplying a fluid flowing through said thimbles of said reactor core into each of said channels formed by said elements.

20. The burnable absorber assembly of claim 18 wherein said channels are arranged in triangular relationship.

21. The burnable absorber assembly of claim 18 including four longitudinally extending tubular elements and wherein said channels are arranged in rectangular relationship.

22. The burnable absorber assembly of claim 19 wherein the quantity of said burnable absorber material varies over a portion of the length of said elements.

* * * * *